May 23, 1944.                E. HIGGINS                2,349,624
FRICTION CLUTCH
Filed May 21, 1943
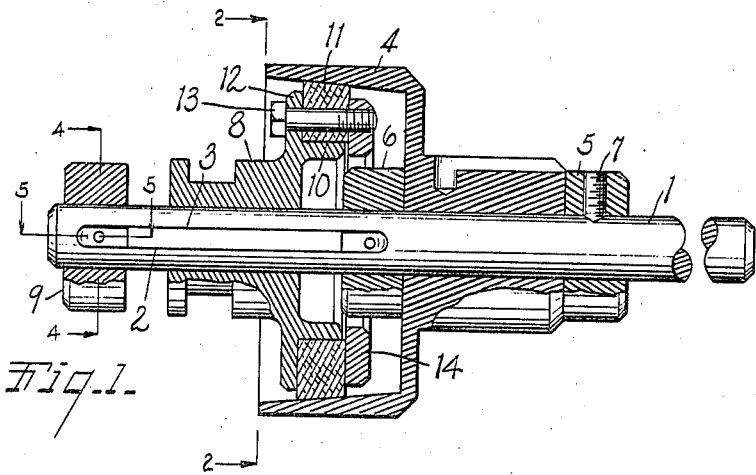
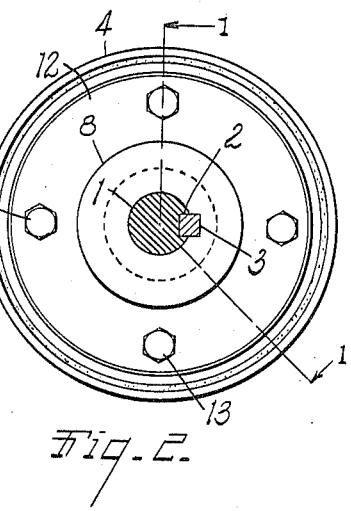
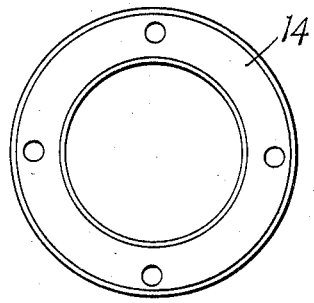
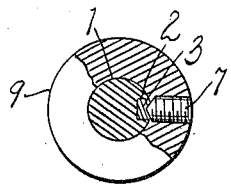
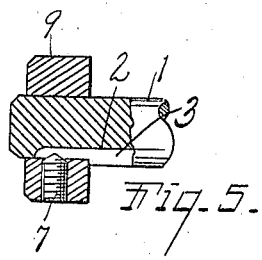
INVENTOR.
Eugene Higgins
BY
Earl H Chappell
ATTORNEYS.

Patented May 23, 1944

2,349,624

UNITED STATES PATENT OFFICE 2,349,624

FRICTION CLUTCH

Eugene Higgins, Jackson, Mich.

Application May 21, 1943, Serial No. 487,843

3 Claims. (Cl. 192—66)

This invention relates to improvements in friction clutches.

The main objects of this invention are:

First, to provide a cone type friction clutch in which the friction element in the form of a ring of yieldable friction material is effectively supported so that the operating stresses thereon are effectively sustained.

Second, to provide a friction clutch including an annular friction ring or shoe element which may be of a material producing a high degree of frictional driving engagement, at the same time one which is supported so that the driving stresses do not result in objectionable distortion thereof.

Third, to provide a friction clutch in which the parts are simple and economical to produce and easily assembled.

Objects relating to details and economies of the invention will appear from the description to follow. The invention is defined and pointed out in the claims.

A preferred embodiment of the invention is illustrated in the accompanying drawing, in which:

Fig. 1 is a fragmentary view mainly in longitudinal section on line 1—1 of Fig. 2 of a friction clutch embodying the features of my invention.

Fig. 2 is a transverse section on line 2—2 of Fig. 1.

Fig. 3 is a side elevation of the friction element clamping ring.

Fig. 4 is a fragmentary transverse section on line 4—4 of Fig. 1.

Fig. 5 is a fragmentary longitudinal section on line 5—5 of Fig. 1.

In the embodiment of my invention illustrated, the shaft 1 may be associated with parts of the machine or apparatus which the clutch is designed to control. This shaft is provided with a longitudinal spline or feather groove 2 receiving the feather 3. The internal cone clutch member 4 is rotatably mounted on the shaft between the collars 5 and 6 which are retained by set screws 7. The coacting clutch member 8 is slidable on the shaft in engagement with the feather 3, a stop collar 9 being provided limiting the outward movement of the slidable clutch member. This member 8 is provided with a grooved hub receiving a shifting lever.

It will be noted by reference to Figs. 1, 4 and 5 that the collars 6 and 9 embrace the ends of the feather which is reduced. The set screws 7 for these collars are preferably arranged to clampingly engage the ends of the spline or feather and thus clampingly bind it in its groove and the collars being sleeved over the ends of the feather further serve to support it in its groove to receive the driving load of the clutch member 8.

The clutch member 8 is provided with an outwardly facing annular seat 10 receiving the friction ring or friction element 11. This seat is provided with a flange 12 at its outer end receiving the bolts 13 which are threaded into the clamping ring 14 arranged in opposed relation to the flanged and clamping friction ring against the flange.

The friction ring is preferably wider than its seat so that an effective compressing clamping engagement results. This effectively supports the friction ring to sustain the driving stresses thereon which are also sustained by the bolts arranged therethrough, and it permits the use of a suitable friction ring—that is, the friction ring may have a substantial degree of compressibility or resilience or be of relatively yieldable material and at the same time the driving stresses are effectively sustained.

My improved clutch has many uses or wide adaptability and at the same time it is simple and economical in its parts and the parts are readily assembled, and should occasion require the friction element can be readily replaced by a relatively unskilled workman or operator.

I have not attempted to illustrate or describe various adaptations which I contemplate as it is believed that this disclosure will enable those skilled in the art to embody or adapt my invention as may be desired.

Having thus described my invention, what I claim as new and desire to secure by Letters Patent, is:

1. In a friction clutch, the combination with a shaft having a longitudinal feather groove therein, of an internal conical clutch member rotatable on said shaft, a coacting clutch member axially slidable on said shaft and provided with an annular friction ring seat having a flange at the outer end thereof, an annular friction ring of yieldable material arranged on said seat to coact with said internal conical clutch member, a clamping ring disposed in opposed relation to said flange, bolts arranged through said flange and friction ring and having threaded engagement with said clamping ring, the friction ring being wider than the seat whereby the friction ring is clampingly supported between said flange and clamping ring, a feather disposed in said groove in said shaft to coact with said slidable clutch member, the ends of said feather being reduced and lying within the periphery of the shaft, collars arranged on said shaft to embrace the reduced ends of said feather, and set screws for said collars engaging the said reduced ends of said feather, one of said collars being arranged within said conical clutch member and constituing a thrust collar therefor, the other constituting a stop collar for said slidable clutch member.

2. In a friction clutch, the combination with a shaft having a longitudinal feather groove therein, of an internal conical clutch member rotatable on said shaft, a coacting clutch member axially slidable on said shaft and provided with an annular friction ring seat having a flange at one end thereof, an annular friction ring arranged on said seat to coact with said internal conical clutch member, a clamping ring disposed in opposed relation to said flange, bolts arranged through said flange and friction ring, a feather disposed in said groove in said shaft to coact with said slidable clutch member, the ends of said feather being reduced and lying within the periphery of the shaft, collars arranged on said shaft to embrace the reduced ends of said feather, and set screws for said collars engaging the said reduced ends of said feathers, one of said collars being arranged within said conical clutch member and constituting a thrust collar therefor, the other constituting a stop collar for said slidable clutch member.

3. In a friction clutch, the combination with a shaft having a longitudinal feather groove therein, of an internal conical clutch member rotatable on said shaft, a feather disposed in said groove in said shaft to coact with said slidable clutch member, the ends of said feather being reduced and lying within the periphery of the shaft, collars arranged on said shaft to embrace the reduced ends of said feather, and set screws for said collars engaging the said reduced ends of said feather, one of said collars being arranged within said conical clutch member and constituting a thrust collar therefor, the other constituting a stop collar for said slidable clutch member.

EUGENE HIGGINS.